United States Patent [19]

Moller

[11] Patent Number: 4,502,505

[45] Date of Patent: Mar. 5, 1985

[54] TELESCOPING BOOM SUPPORTED CLUSTERED SERVICE LINE

[75] Inventor: Thomas A. Moller, Brea, Calif.

[73] Assignee: FMC Corporation, Chicago, Ill.

[21] Appl. No.: 422,807

[22] Filed: Sep. 24, 1982

[51] Int. Cl.³ .............................................. F16L 3/00
[52] U.S. Cl. ..................................... 137/615; 137/899
[58] Field of Search ................................. 137/615, 899

[56] References Cited

U.S. PATENT DOCUMENTS

| | | | |
|---|---|---|---|
| 3,053,320 | 9/1962 | Steincamp | 166/75 |
| 3,217,748 | 11/1965 | Harper | 137/615 |
| 3,281,080 | 10/1966 | Hogg | 137/615 |
| 3,399,909 | 9/1968 | Ambrose | 137/615 |
| 3,459,222 | 8/1969 | McElroy | 137/615 |
| 3,498,325 | 3/1970 | Ashton et al. | 137/615 |
| 3,721,260 | 3/1973 | Stahmer | 137/615 X |
| 3,942,554 | 3/1976 | Werner et al. | 137/615 |
| 3,964,512 | 6/1976 | Dumas | 137/615 |
| 4,092,996 | 6/1978 | Kock | 137/615 X |
| 4,130,134 | 12/1978 | Castle | 137/615 |
| 4,276,917 | 7/1981 | Fujita | 137/615 X |
| 4,391,297 | 7/1983 | Knight | 137/615 |
| 4,468,166 | 8/1984 | Jameson | 141/387 X |

*Primary Examiner*—A. Michael Chambers
*Assistant Examiner*—John C. Fox
*Attorney, Agent, or Firm*—Lloyd B. Guernsey; Henry M. Stanley; Richard B. Megley

[57] ABSTRACT

A telescoping boom assembly supported articulated well service pipeline for the transfer of pressurized fluids from service vehicles to petroleum wellheads for the treatment and stimulation of production oil wells. The boom assembly is mounted on a truck, trailer, or other suitable mobile transport, and the articulated pipeline comprises a plurality of long straight pipeline sections interconnected by a plurality of shorter pipe sections and by swivel joints. The inboard end of the pipeline is connected to a supply line by an inboard pipe and a pair of swivel joints. The pipeline can be folded into a cluster and tilted for storage adjacent the inboard end of the boom assembly and the clustered pipeline moved away from the service vehicle before unfolding the pipeline from the cluster. Retaining the pipeline in a compact cluster while moving the clustered pipeline between the storage position and a position beside the service vehicle provides an extra amount of clearance between the service vehicle and the pipeline to prevent a collision with any obstacle on the service vehicle.

9 Claims, 16 Drawing Figures

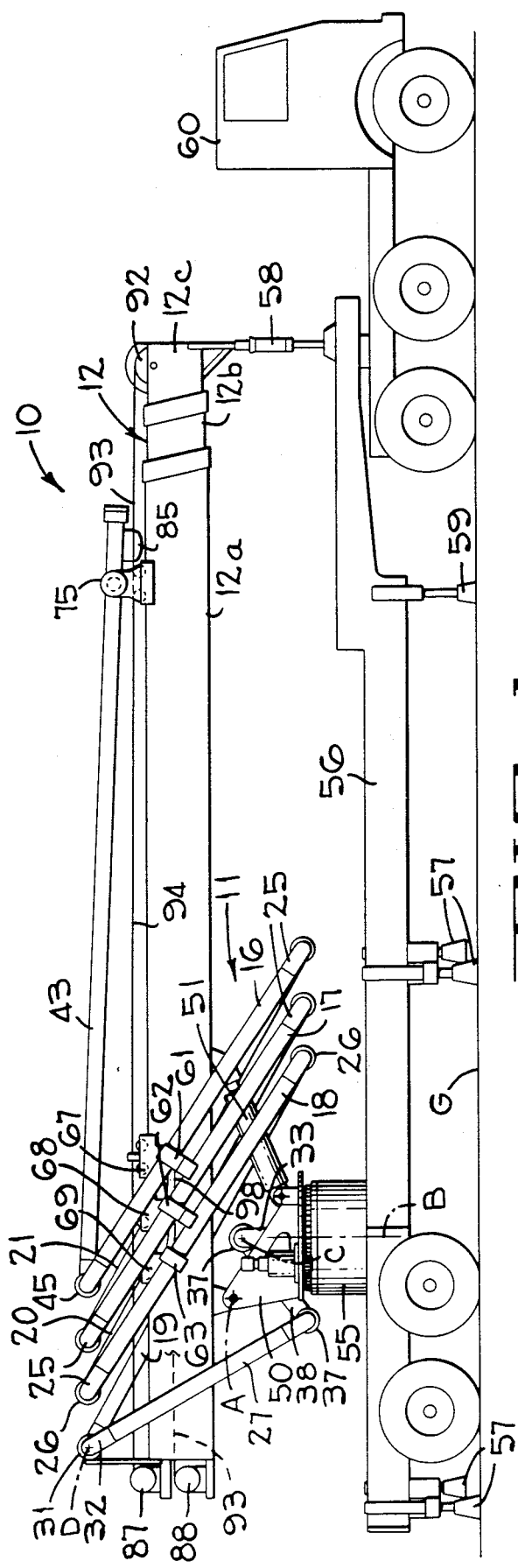
FIG_1
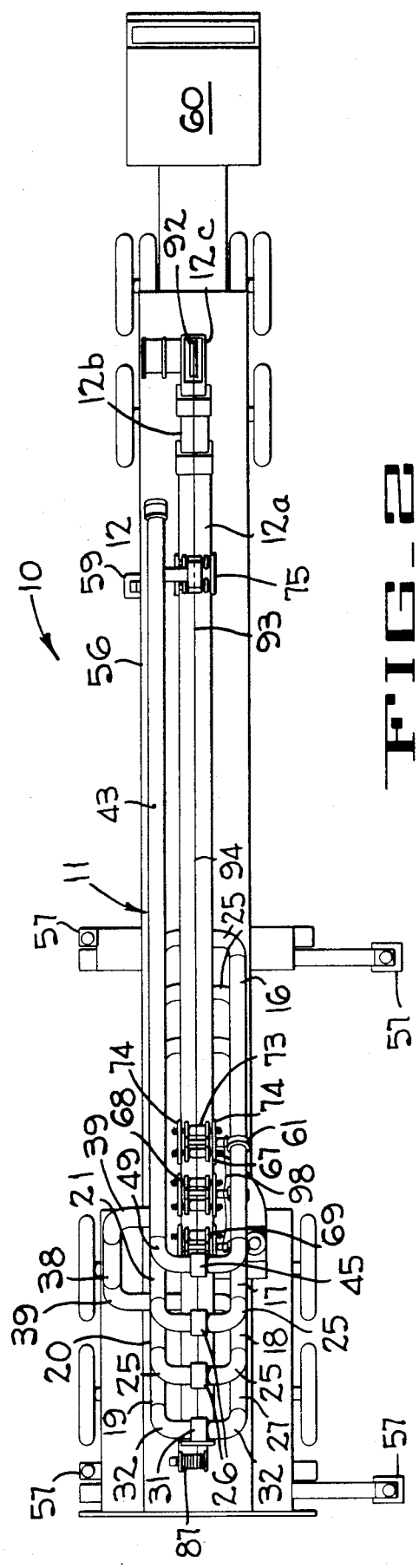
FIG_2

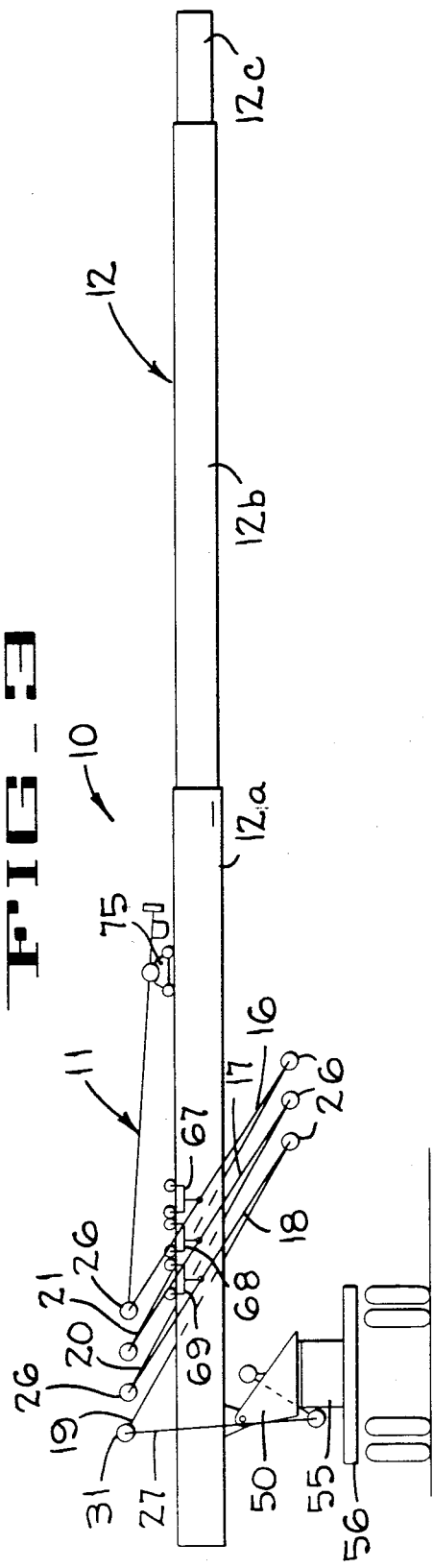
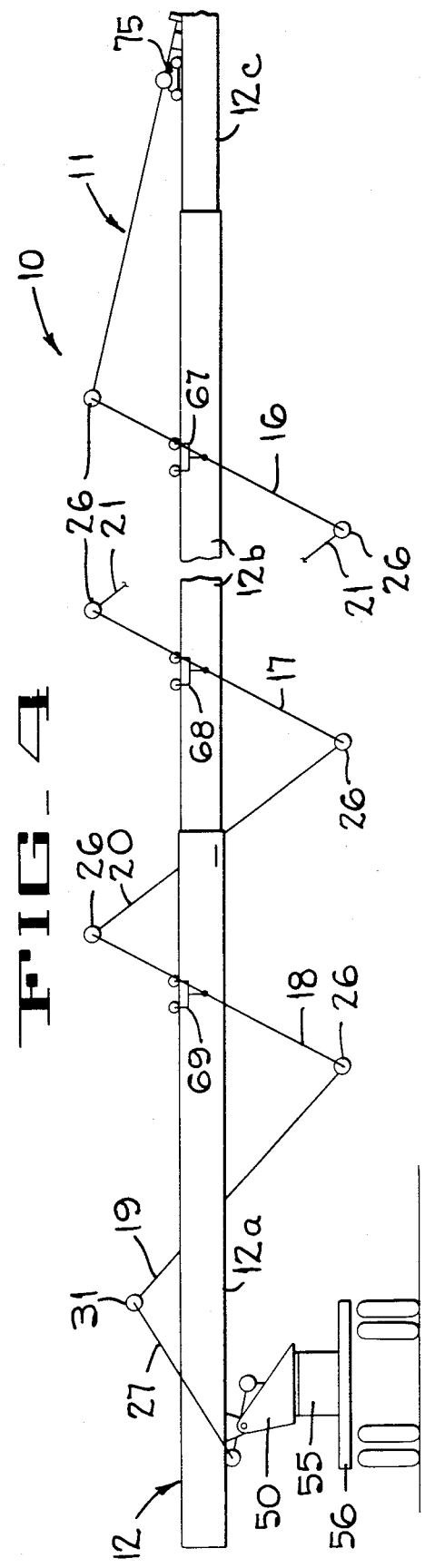

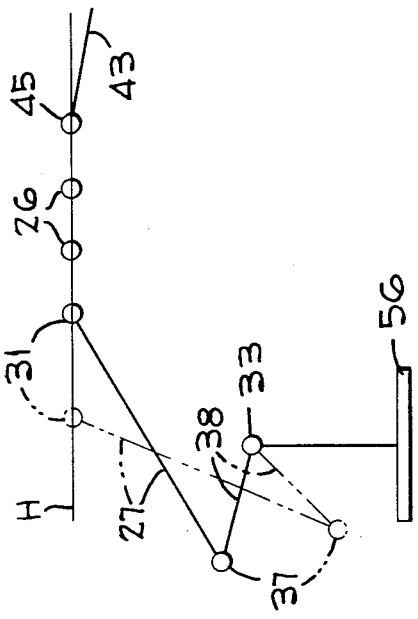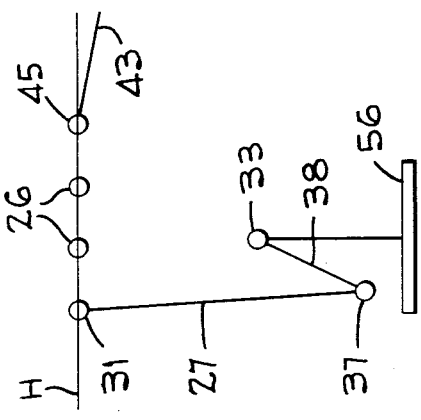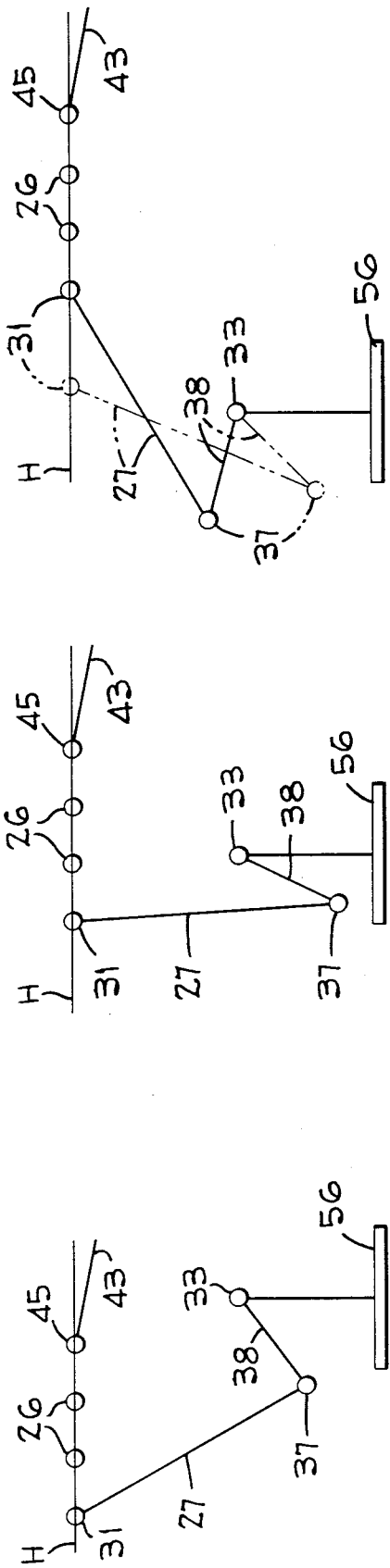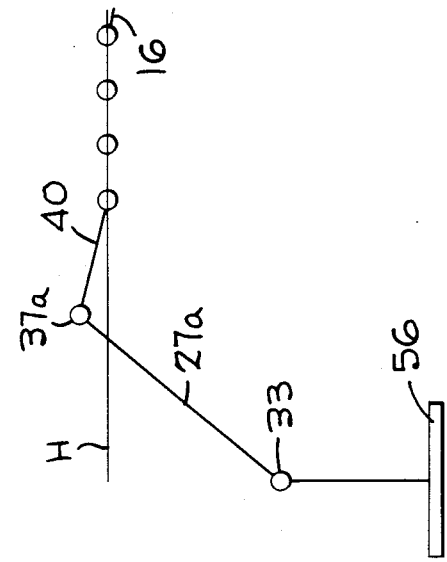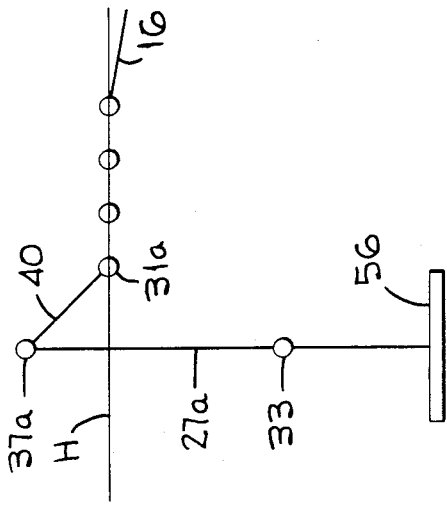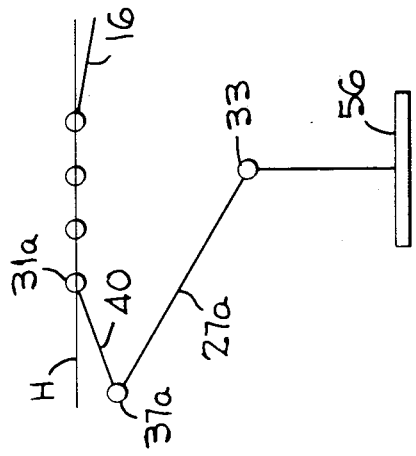

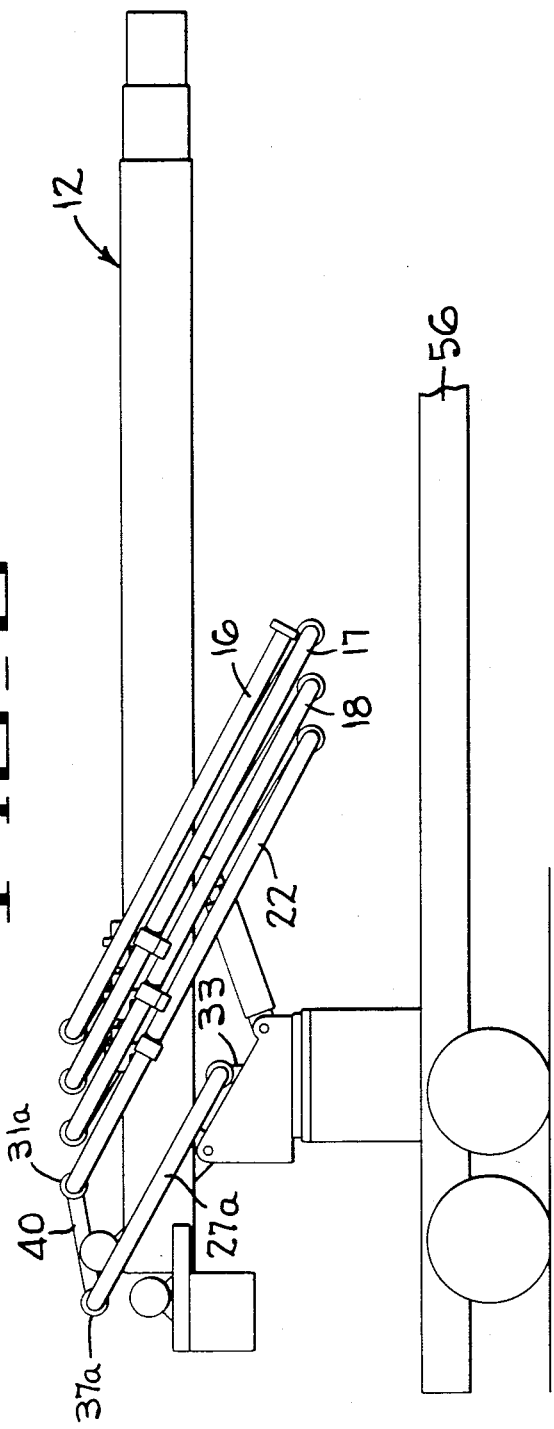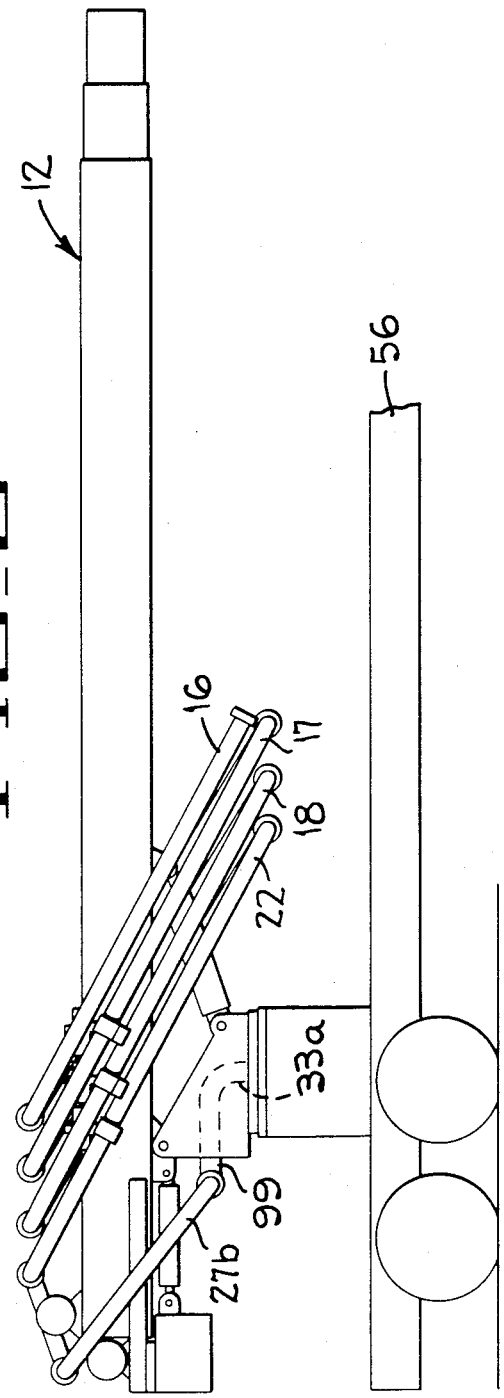

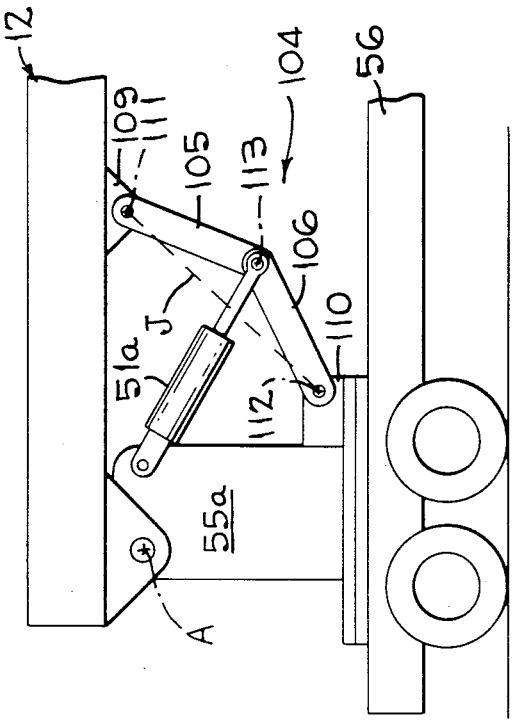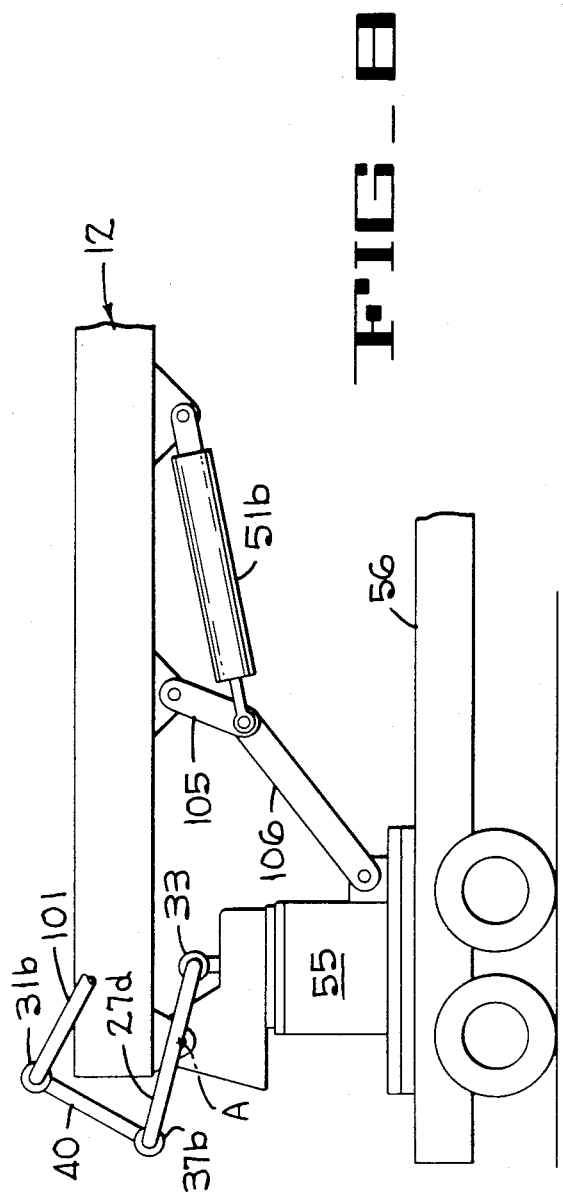

TELESCOPING BOOM SUPPORTED CLUSTERED SERVICE LINE

BACKGROUND OF THE INVENTION

1. Field of the Invention

This invention relates to well servicing equipment, and more particularly, to apparatus for conducting pressurized fluids from a service vehicle to a wellhead.

2. Description of the Prior Art

During the course of producing fluids from a petroleum well it is often desirable or necessary to subject the well to a treatment procedure in order to stimulate its fluid production. This procedure usually involves the injection of fluids under high pressure, such as 20,000 psi, to fracture the producing earth formations, or the injection of an acid solution to dissolve or otherwise remove flow obstructing material, thereby increasing the flow of petroleum from the formation into the well. In order to carry out these well stimulation procedures, it is commonplace to employ an articulated pipe assembly, called a service line, to conduct the fluid from a pump system to the wellhead. Such a service line usually comprises a plurality of straight links of rigid pipe interconnected end-to-end by pipe swivel joints, and sufficient pipe unions to facilitate disassembly into sections that can be handled manually.

Where pipe of larger than normal diameter and thus of greater weight is used, in order to increase the volume of fluid injected into the well at a given time period, or to reduce the time for injecting a given fluid volume, additional personnel and/or time are required to unload the service line sections from their transport, assemble them and connect the line to the wellhead and then disassemble the line and reload the sections upon completion of fluid injection. Another disadvantage of a conventional service line is that it rests unrestrained on the ground between the transport and the wellhead and thus is free to whip about and possibly injure personnel or equipment if it breaks under pressure. Fluid flowing through the service line causes the line to vibrate so that the line may sink into any ground that is muddy or soft.

It is also known to employ an articulated well service pipeline mounted on a mobile telescoping boom assembly. This articulated pipeline may include a relatively large number of fairly short sections of pipe interconnected by a plurality of elbows and swivel joints that extend from and retract into their rest or stowed position in an accordion-like manner. Such accordion-type service lines are moved from a folded position toward an extended position by first unfolding the outboard portion of the service line and then successively unfolding other portions nearest the unfolded outboard portion as the outboard end of the line is moved outward. This causes the individual pipe sections to be oriented in a generally vertical position with the lower end of each pipe section adjacent the service vehicle where such pipe sections may collide with obstacles which may be on the service vehicle.

SUMMARY OF THE INVENTION

The present invention overcomes the foregoing disadvantages by providing an articulated well service pipeline mounted on and supported at all times by a mobile telescoping boom assembly that can be extended from its transport base to carry the service line to a wellhead for connection thereto in a relatively safe, easy, quick and efficient manner. The service line includes a plurality of relatively long sections of pipeline interconnected by a plurality of pipe elbows and swivel joints with the pipeline folding into a cluster and tilted away from a vertical position for storage adjacent the inboard end of the boom assembly. An inboard pipe and a pair of swivel joints connected between the folded pipeline and a supply pipe allow the pipeline to be moved over the side of the service vehicle while the pipeline remains folded and tilted so that a relatively large amount of clearance is maintained between the pipeline and the service vehicle. This prevents the pipeline from colliding with obstacles which may be on the service vehicle and allows the boom assembly to be mounted a shorter distance above the service vehicle. After the clustered pipeline is over the side of the service vehicle the pipeline is unfolded and extended to reach a wellhead for service.

BRIEF DESCRIPTION OF THE DRAWINGS

FIG. 1 is a side elevation of one embodiment of the boom supported clustered service line of the present invention showing the service line in a fully retracted position.

FIG. 2 is a plan view of the embodiment of the boom supported clustered service line of FIG. 1 showing the service line in a fully retracted position.

FIG. 3 is a diagrammatic side elevation of the embodiment of the clustered service line of FIG. 1 showing the service line in a plurality extended position but with the outer portion of the service line still clustered.

FIGS. 3A, 3B, 3C illustrate the sequence of operation as the service line of FIG. 1 moves from the fully retracted position to a position where the outer portion of the service line is still clustered but the inner portion is unfolded to extend the clustered portion over the side of the service vehicle.

FIG. 4 is a diagrammatic side elevation of the clustered service line of FIG. 1 showing the end portion of the service line in a partially extended position.

FIG. 5 is a side elevation of another embodiment of a boom supported clustered service line of the present invention showing the service line in a fully retracted position.

FIGS. 5A, 5B, 5C illustrate the sequence of operation as the service line of FIG. 5 moves from the fully retracted position to a position where the outer portion of the service line is still clustered but the inner portion is unfolded to extend the clustered portion over the side of the service vehicle.

FIG. 6 is a side elevation of still another embodiment of the clustered service line of the present invention in a retracted position.

FIGS. 7 and 8 illustrate force multiplying devices to enable the lifting of the boom with a relatively small hydraulic cylinder.

FIGS. 8A, 8B illustrate the sequence of operation of the service line of FIG. 8.

DESCRIPTION OF THE PREFERRED EMBODIMENT

As shown in FIGS. 1-4, a telescoping boom supported clustered service line 10 according to the present invention comprises an articulated service line assembly 11 (FIG. 1) mounted on a telescoping boom assembly 12. The service line 11 (FIGS. 1, 2) includes a plurality of relatively long clustered pipe sections 16–21 interconnected by a plurality of pipe elbows 25 and swivel joints 26. A shorter inboard pipe 27 is connected to the pipe section 19 by a swivel joint 31 and a pair of pipe elbows 32. An inner end of the pipe 27 is connected to a supply pipe 33 (FIG. 1) by a swivel joint 37, a short piece of pipe 38 and a plurality of pipe elbows 39. The outer end of the pipe section 16 can be connected to a wellhead (not shown) by an outboard pipe 43, interconnected to pipe section 16 by a swivel joint 45 and a pipe elbow 49.

The telescoping boom 12 (FIGS. 1-4) comprises three boom sections 12a, 12b and 12c. The inner section 12a which is not extendable, is pivotally mounted on a turret 50 for rotation in a vertical plane about a horizontal axis A by an elevating cylinder 51. The turret 50 (FIG. 1) is mounted on a cylindrical base 55 for rotation about a vertical axis B, and the entire apparatus is suitably mounted on a trailer frame 56 or other suitable mobile transport vehicle for moving the apparatus to the job sites. A plurality of extendable outriggers 57 provide stability for the trailer frame 56 when the boom assembly 12 and the service line 10 are extended for operation. The details of the telescoping boom 12, and of the means for operating it, are not critical to the present invention, and are well known in the industry.

An adjustable jack stand 58 (FIG. 1) can be positioned at the tip of the boom assembly 12 to provide an additional support to relieve the boom of cantilever loading during the fluid transfer operation. The jack can be pivotally connected, in a removable manner or otherwise as desired, to the tip of the boom assembly on the outer end of the boom section 12c. Thus, the jack stand can be a separate portable apparatus or can be carried by the boom to lessen the manual effort required to install and remove it. A pair of manually operated landing gear 59 (FIGS. 1-4) provide support for the forward portion of the trailer 56 so a truck cab 60 can be disconnected from the trailer.

The pipeline sections 16-19 (FIGS. 1-4) are each connected to the boom assembly 12 by a corresponding bracket 61-63 and by a service line trolley 67-69 for movement along the length of the boom assembly. Each of the trolley 67-69 (FIG. 2) includes a plurality of rollers 73 rotatably mounted between a pair of side frames 74. The outer end of the pipe 43 is supported by another trolley 75 (FIGS. 1-4) and a service line skid 85 is connected to support the outer end of the outboard pipe 43.

A pair of winches 87, 88 (FIG. 1), a sheave 92 and a cable 93 provide means for moving the service line assembly 11 from the retracted position shown in FIG. 1 to the extended position shown in FIG. 4 and to return it to the retracted position when desired. The cable 93 extends from the winch 88 through the boom assembly 12, over the sheave 92 to the trolley 75. When the boom assembly 12 is in the extended position and the winch 88 is energized, the cable 93 pulls the trolley 75 and the outer end of the pipe 43 outward into the position shown in FIG. 4. When the winch 87 is energized the cable 93 pulls the trolley 75 and the attached service line assembly into the retracted position shown in FIG. 1, and the boom assembly can be retracted also back into the position shown in FIG. 1 by the conventional means (not shown).

Operation of the telescoping boom supported clustered service line according to the present invention can be effected as follows. After transportation to the job site, the vehicle mounted apparatus is positioned at a safe convenient location with respect to the wellhead, and the outriggers 57 extended into functional position. The telescoping boom assembly is aligned with the wellhead, as by rotating the turret 50 and/or elevating or lowering the boom by means of the cylinder 51, and the boom sections 12b, 12c are extended to a desired position near the wellhead. At this time the jack stand 58 is positioned and set, and the winch 88 is energized to pull the service line assembly 11 into position for connecting the outer end of the pipe 43 to the wellhead.

A chain 98 or other retaining means (FIG. 1) secured between the pipeline section 18 and the pipeline section 16 retains the pipeline sections 16-21 in a cluster as the lower ends of these section are moved from a position above the trailer 56 (FIG. 1) to a position over the side of the trailer (FIG. 3). This causes the pipeline sections to be clustered and tilted so the lower ends of the pipeline sections 16-21 are a safe distance above the trailer as the outboard end of the service line assembly 12 is extended outwardly. An additional purpose of moving the cluster of pipes back above the cylindrical base 55 is to minimize the overturning moment on the entire structure while the boom is being extended horizontally and before the jack 58 is placed on the ground to support the outer end of the boom. Winch 88 and cable 93 cause the trolleys 75, 67 to move toward the outer end of the boom section 12c causing the pipes 38, 27 to pivot about the horizontal axes C, D as the clustered pipeline sections move outwardly to the side of the trailer 56.

This sequence of operation is diagrammatically shown in FIGS. 3A-3C. In the folded position of FIG. 3A the swivel joint 31 and the pipe elbows 32 (FIGS. 1, 2) lie along the horizontal line H (FIG. 3A). As the swivel joint 31 and the pipe elbows 32 move outward to the position of FIG. 3B the swivel joint 37 moves downward as pipe 38 pivots about the swivel joint 33, but the swivel joint 31 remains on the horizontal line H. When the swivel joint 31 moves further outward toward the position shown in FIG. 3C the joint 31 continues to remain on the horizontal line H as the joint 37 and the pipe 38 move upward. This horizontal movement of the swivel joint 31 reduces the probability of a collision between the inner portion of the pipeline and nearby overhead objects as the pipeline is extended. After the inner portions of the pipeline has moved into the position shown in FIG. 3C the chain 98 (FIG. 1) is removed so that further outward movement of the trolley 75 causes the trolleys 67-69 to move outward along the boom assembly 12 and moves the lower ends of the pipeline sections 16-21 to a position near the ground G as shown in FIG. 4.

Following treatment of the well the winch 87 is energized to move the service line into the cluster position (FIG. 3) and the chain 98 is again connected around the pipeline sections 18, 16 to retain the pipeline sections 16-21 in a clustered and tilted position as the service line assembly 11 is moved back into the stowed position disclosed in FIG. 1 for transport to another job site.

Other Embodiments Of The Present Invention

The embodiment shown in FIG. 5 differs from the embodiment shown in FIGS. 1-4 mainly by connecting the lower end of the inboard pipe 27a directly to the supply pipe 33 rather than using the short pipe 38 shown in FIG. 1. The clustered pipeline includes an additional section 22 to provide additional length for the service line assembly and a short pipe 40 connected between the upper end of the pipeline section 22 and the inboard pipe 27a. The swivel joint 31a moves along the horizontal line H as the inner portion of the pipeline moves from the retracted position shown in FIG. 5A through the position shown in FIG. 5B to the position shown in FIG. 5C. The swivel joint 37a does extend a short distance above the horizontal line H at some of the intermediate positions as shown in FIG. 5B.

The embodiment of the service line assembly shown in FIG. 6 is like the embodiment disclosed in FIG. 5 except for an extension pipe 99 connected between an inboard pipe 27b and a supply pipe 33a. The clustered pipeline assembly includes the pipeline sections 16–18 and 22 disclosed in FIG. 5.

FIG. 7 discloses an improved apparatus for raising and lowering the boom assembly 12 about the horizontal axis A. The apparatus includes a scissors linkage 104 having a pair of linkage members 105, 106 pivotally connected between an ear 109 on the boom assembly 12 and an ear 110 on the cylinder base 55a by a pair of pins 111, 112. A hydraulic cylinder 51a is connected between the cylinder base 55a and a pin 113 which joins the linkage members 105, 106. The cylinder 51a exerts a force substantially at right angles to a line J drawn between the pins 111, 112 so the lift force exerted on the boom assembly 12 by the linkage member 105 is considerably greater than the force provided by the cylinder 51a. This allows the cylinder 51a to be smaller and less expensive than the elevating cylinder 51 of FIG. 1 which lifts the boom assembly directly.

The embodiment shown in FIG. 8 is similar to the embodiment disclosed in FIG. 5 except the pipeline section 27d is shorter than the section 27b of FIG. 5 so the joint 37b does not rise as far above the horizontal line H as it moves from the retracted position shown in FIG. 8A to the position shown in FIG. 8B. A scissors linkage 104a is similar to the scissors linkage of FIG. 7 except the cylinder 51b extends to lift the boom assembly 12 rather than retracts as in FIG. 7.

The present invention discloses a boom supported articulated service line comprising a plurality of long straight pipeline sections interconnected by a plurality of shorter pipe sections and by swivel joints. The inboard end of the pipeline is connected to a supply pipe by an inboard pipe and a pair of swivel joints. The pipeline can be folded into a cluster and tilted for storage adjacent the inboard end of the boom assembly and the clustered pipeline moved away from the supporting service vehicle before unfolding the pipeline from the cluster. Retaining the pipeline in a compact cluster while moving the pipeline betwen the storage position and a position beside the service vehicle provides an extra amount of clearance between the service vehicle and the pipeline to prevent a collision with any obstacle on the service vehicle.

Although the best mode contemplated for carrying out the present invention has been herein shown and described, it will be apparent that modification and variation may be made without departing from what is regarded to be the subject matter of the invention.

What is claimed is:

1. A boom-supported articulated pipeline for use with a boom assembly for mounting on a transport device having a supply pipe, said pipeline comprising:
   a plurality of pipeline sections;
   a plurality of pivotal joints connected between said pipeline sections to form a folding pipeline;
   means for supportively connecting said boom assembly to said pipeline sections;
   first and second inboard pipes;
   a first swivel joint connected between a first end of said first inboard pipe and a second end of said second inboard pipe;
   a second swivel joint connected between said supply pipe and a first end of said second inboard pipe;
   a third swivel joint connected between a second end of said first inboard pipe and an inboard end of said folding pipeline;
   means for folding and tilting said pipeline sections into a folded and tilted position to raise said pipeline above said transport device when said pipeline is adjacent said supply pipe;
   means for retaining said pipeline sections in said folded and tilted position as said pipeline sections are moved along said boom assembly; and
   means for extending said second end of said first inboard pipe outward from said supply pipe to move said pipeline sections outward from said supply pipe while retaining said pipeline sections in a folded and tilted position.

2. A boom-supported pipeline as defined in claim 1 wherein said retaining means includes means for retaining said pipeline in a folded and tilted position until said pipeline is moved away from a position above said transport device.

3. A boom-supported pipeline as defined in claim 2 including support means connected to said pipeline and movably mounted on said boom assembly to move said pipeline between said position adjacent said supply pipe and said position away from said transport device.

4. A boom-supported pipeline as defined in claim 1 wherein said retaining means includes means for retaining said pipeline sections in a substantially parallel arrangement when said pipeline is in said folded and tilted position.

5. A boom-supported articulated pipeline for use with a telescoping boom assembly having a plurality of boom sections for mounting on a transport device having a supply pipe, said pipeline comprising:
   a plurality of pipeline sections;
   a plurality of pivotal joints connected between said pipeline sections to form a folding pipeline;
   means for supportively connecting said boom sections to said pipeline sections;
   first and second inboard pipes;
   a first swivel joint connected between a first end of said first inboard pipe and a second end of said second inboard pipe;
   a second swivel joint connected between said supply pipe and a first end of said second inboard pipe;
   a third swivel joint connected between a second end of said first inboard pipe and an inboard end of said folding pipeline;
   means for folding and tilting said pipeline sections to raise said pipeline sections above said transport device when said pipeline sections are adjacent said supply pipe;
   means for retaining said pipeline sections in said folded and tilted position as said pipeline sections are moved along said boom assembly; and
   means for extending said inboard pipe outwardly from said supply pipe to a position away from said transport device while retaining said pipeline sections in a folded position.

6. A boom-supported pipeline as defined in claim 5 wherein said retaining means includes means for securing said pipeline sections in a cluster which is tilted away from a vertical position and for retaining said pipeline sections in a tilted position until said pipeline sections are no longer above said transport device.

7. A boom-supported articulated pipeline for use with a boom assembly for mounting on a transport device having a supply pipe, said pipeline comprising:
- a plurality of pipeline sections;
- a plurality of pipe elbows;
- a plurality of serially connected inboard pipes,
- a plurality of pipe swivel joints interconnecting said pipe elbows and said pipeline sections to form a pipeline portion which folds into a cluster, and, interconnecting said pipeline sections and said supply pipe with said inboard pipes;
- means for mounting said pipeline cluster in a titled position on said boom assembly for storing said cluster adjacent said supply pipe;
- means for retaining said pipeline cluster in a tilted position as said pipeline cluster is moved along said boom assembly; and
- means for moving said tilted cluster over the said of said transport device to provide a clearance between said pipeline and said transport device.

8. A boom-supported pipeline as defined in claim 7 including means for expanding said pipeline sections outwardly when said pipeline sections are no longer above said transport device and for returning said pipeline sections into a tilted cluster prior to moving said sections to a position above said transport device.

9. A boom-supported pipeline as defined in claim 7 including a scissors linkage having first and second linkage members pivotally interconnected, means for pivotally connecting a first end of said scissors linkage to said boom assembly, means for pivotally connecting a second end of said scissors linkage to said transport device, and power means connected to a junction of said first and said second linkage members for moving said linkage members toward and away from a straight line alignment to raise and lower said boom assembly.

* * * * *